United States Patent
Ney

(10) Patent No.: US 11,899,164 B1
(45) Date of Patent: Feb. 13, 2024

(54) SOLAR POWERED DIGITAL HARVEST DAYS COUNTER

(71) Applicant: Jason Ney, Tucson, AZ (US)

(72) Inventor: Jason Ney, Tucson, AZ (US)

( * ) Notice: Subject to any disclaimer, the term of this patent is extended or adjusted under 35 U.S.C. 154(b) by 0 days.

(21) Appl. No.: 18/175,625

(22) Filed: Feb. 28, 2023

Related U.S. Application Data

(60) Provisional application No. 63/425,340, filed on Nov. 15, 2022.

(51) Int. Cl.
*G01W 1/12* (2006.01)

(52) U.S. Cl.
CPC ................... *G01W 1/12* (2013.01)

(58) Field of Classification Search
CPC ........................................ G01W 1/12
See application file for complete search history.

(56) References Cited

U.S. PATENT DOCUMENTS

| | | | |
|---|---|---|---|
| 4,168,124 A * | 9/1979 | Pizzi | G01J 1/42 356/218 |
| 4,218,139 A * | 8/1980 | Sheffield | G01J 1/42 356/218 |
| 5,471,402 A | 11/1995 | Owen | |
| 5,686,727 A * | 11/1997 | Reenstra | A61F 5/028 250/372 |
| 6,760,099 B1 * | 7/2004 | Lewis | G01J 1/16 356/218 |
| 7,705,277 B2 | 4/2010 | Noble | |
| 8,590,527 B2 | 11/2013 | Luconi | |
| 10,095,997 B2 | 10/2018 | Adler | |
| 2013/0318097 A1 | 11/2013 | Gambhir | |
| 2016/0311244 A1 | 10/2016 | Pullaro | |

* cited by examiner

*Primary Examiner* — Thanh Luu
(74) *Attorney, Agent, or Firm* — Brennan, Manna & Diamond, LLC

(57) ABSTRACT

The present invention relates to a novel counter system for keeping track of light cycles (i.e., light exposure) for plants and other aged products. The counter system is in the form of a small and compact weatherproof device designed to stake into the ground proximal to a crop such that solar light falls on the solar panel disposed on the top of the device. The device has a counter for incrementing a tally of days and/or hours by one unit upon tracking a light cycle for plants. In one embodiment, when the voltage detected by the counter drops to zero, a tally day is increased and the updated counter is displayed on a display screen of the device. In another embodiment, the device may be controlled remotely by a user. The device can be reset to zero and can also be configured for a specific crop.

20 Claims, 7 Drawing Sheets

US 11,899,164 B1

SOLAR POWERED DIGITAL HARVEST DAYS COUNTER

CROSS-REFERENCE TO RELATED APPLICATION

The present application claims priority to, and the benefit of, U.S. Provisional Application No. 63/425,340, which was filed on Nov. 15, 2022, and is incorporated herein by reference in its entirety.

FIELD OF THE INVENTION

The present invention generally to the field of digital counters. More specifically, the present invention relates to a novel solar power digital counter for tracking light cycles for plants and other aged products. The counter device can be staked into the ground near a crop and counts and displays light days (or light hours) for indicating to a user to harvest crops on a particular day. The device is solar powered and has a screen for displaying tally days, thereby eliminating manually marking of a calendar by users for harvesting dates. Accordingly, the present disclosure makes specific reference thereto. Nonetheless, it is to be appreciated that aspects of the present invention are also equally applicable to other like applications, devices, and methods of manufacture.

BACKGROUND

By way of background, crops are referred to as plants of the same kind cultivated at one place and specifically, a crop is a plant or plant product that can be grown and harvested for profit or subsistence. Harvesting is one of the most important agricultural practices followed for crop reaping and is the method of collecting a ripe crop from the fields. Once the crop is matured or fully ripen, they are cut and gathered (reaping) and the collective process is called harvesting. Harvesting of crops depends on many factors such as the season, the crop variety, the maturity period, and more.

Remembering and maintaining a calendar for harvesting dates is important for individuals who harvest crops and other aged products. In fact, such dates and calendar form an essential part of a farmer's knowledge base toolkit. Forgetting or losing track of harvest dates may lead to suboptimal growth of plants. Accurately maintaining and remembering the crop calendar is difficult for farmers and farm owners as they maintain multiple crops, fields, and farms; and, harvests may be ruined due to misremembering of the harvesting dates.

Manually maintaining and writing harvest dates and light cycles (days and/or hours) is not only difficult but also ineffective. Individuals may forget to harvest their crops on a particular day and that affects the growth and quality of the crops and edible products. Individuals desire an improved method and device for keeping track of light cycles (number of harvest days) for their crops and other aged products.

Therefore, there exists a long-felt need in the art for a device to automatically keep track of harvest days, or cumulative light exposure, of crops, plants, and other aged products. There is also a long-felt need in the art for a crop harvest days counter device that eliminates manual marking of a calendar by a user for tracking harvest days. Additionally, there is a long-felt need in the art for a novel small counter system that prevents individuals from forgetting harvest days, and/or accumulated light exposure, of their crops. Moreover, there is a long-felt need in the art for a digital counter device that can be used for any crop and can be installed in a garden or farm for counting and maintaining harvest days. Further, there is a long-felt need in the art for a digital counter device that counts a harvest day on transition between day and night by measuring solar energy and cumulative light exposure. Finally, there is a long-felt need in the art for an improved way of keeping track of days for harvesting and other agricultural processes for different types of crops without manually maintaining a calendar and marking days.

The subject matter disclosed and claimed herein, in one embodiment thereof, comprises a crop harvest days digital counter system. The device is designed as a compact unit and a user can stake the device into the ground near a crop for keeping track of light cycles (i.e., cumulative light exposure) of plants, crops, and the like. The device is weatherproof, lightweight, and includes a housing and a stake, the stake has a pointed end for staking into the ground, the housing has a solar panel disposed on the top surface thereof for absorbing solar energy, a counter circuit module for detecting a voltage received from the solar panel, wherein the counter circuit module increases a counter value by one unit when the detected voltage drops to zero, a display screen disposed on the front surface of the housing configured to display the counter or cumulative value, wherein the counter value indicates the count of passed days and/or light exposure. The system can be monitored remotely by a user using a remote electronic device.

In this manner, the crop harvest days digital counter system of the present invention accomplishes all of the forgoing objectives and provides users with a solar powered digital counter used to keep track of light cycles for plants and other aged products. The system indicates the days passed since the last harvest and prevents individuals from forgetting to harvest their crops on a particular day and thus maximizing growth efficiency for the product. The system eliminates manual marking of a calendar by a user for tracking harvest days and allows users to install the device directly within a garden or other growing area to tally the days and/or light exposure.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a crop harvest days digital counter device. The device is designed as a compact and portable device for keeping track of light cycles or cumulative light exposure of plants, trees, crops, and the like. The device further comprising a housing and a stake, the stake extends downwards from the bottom surface of the housing and has a pointed end for staking into the ground, the housing has a solar panel disposed on the top surface thereof for absorbing solar energy, a counter circuit module for detecting a voltage received from the solar panel, wherein the counter circuit module increases a counter value by one unit when the detected voltage drops to zero, a display screen disposed on the front surface of the housing configured to display the counter value, wherein the counter value indicates the count of passed days and/or cumulative light exposure. The device is configured to detect a transition from a day to a night when the counter circuit module detects a zero-voltage indicating absence of solar power.

In yet another embodiment, the counter device includes a wireless chip module for establishing a wireless channel with a remote electronic device allowing a user to remotely monitor the counter device.

In yet another embodiment, the counter value indicates the number of days passed since the last harvest occurred.

In yet another embodiment, the counter device is staked into the ground using the pointed end of the stake.

In yet another embodiment, the counter device is weatherproof and has IP66 rating.

The subject matter disclosed and claimed herein, in one embodiment thereof, comprises a small counter system for keeping track of light cycles for plants and other naturally aged/grown crops. The device utilizes a solar powered panel to trigger a digital counter and tally days (or hours) displayed on a display screen disposed in front of the device. A stake is used for staking the device into a ground near the crops. The tally days are also transmitted to a remote electronic device coupled to the counter system for display on the remote electronic device.

In yet another embodiment, the counter system is configured to compare the tally days/hours with a threshold number of days/hours such that an alert is generated when the tally days/hours is equal to the threshold number of days/hours for alerting a user to harvest crops for optimal growth.

In another aspect of the present invention, the counter control circuit detects a voltage of approximately 1.5V for detecting daytime and 0V for detecting nighttime and thus, increments the counter indicating completion of a light day.

In yet another embodiment, the crop harvest days digital counter device of the present invention is easily and efficiently manufactured, marketed, and available to consumers in a cost-effective manner and is easily installed and used by users for enabling users to keep track of passing days without having to manually mark a calendar.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
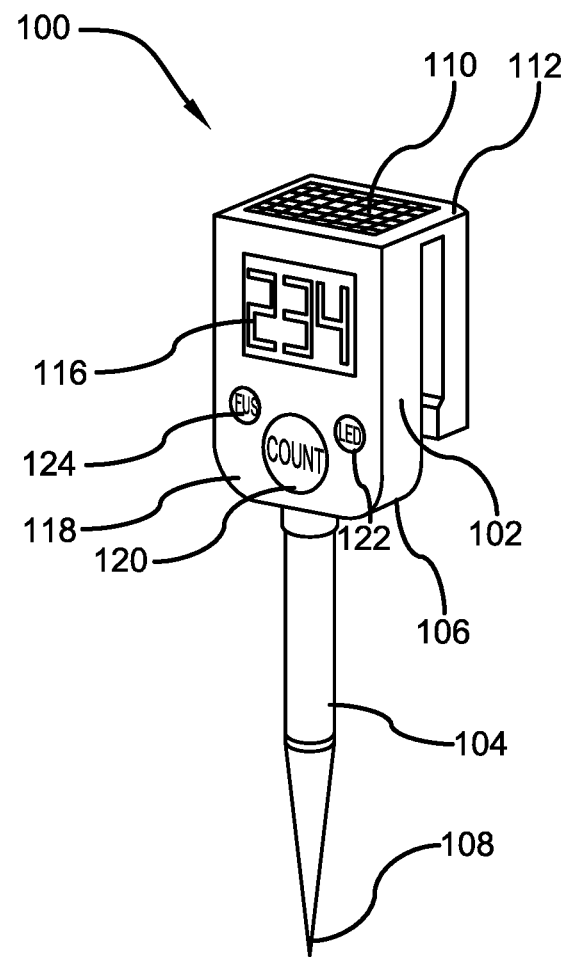
FIG. 1 illustrates a perspective view of one potential embodiment of a solar powered digital counter device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device to automatically keep track of harvest days, or cumulative light exposure, of crops, plants, and other aged products. There is also a long-felt need in the art for a crop harvest days counter device that eliminates manual marking of a calendar by a user for tracking harvest days. Additionally, there is a long-felt need in the art for a novel small counter system that prevents individuals from forgetting harvest days, and/or accumulated light exposure, of their crops. Moreover, there is a long-felt need in the art for a digital counter device that can be used for any crop and can be installed in a garden or farm for counting and maintaining harvest days. Further, there is a long-felt need in the art for a digital counter device that counts a harvest day on transition between day and night by measuring solar energy and cumulative light exposure. Finally, there is a long-felt need in the art for an improved way of keeping track of days for harvesting and other agricultural processes for different types of crops without manually maintaining a calendar and marking days.

The present invention, in one exemplary embodiment, is a small counter system for keeping track of light cycles for plants and other naturally aged crops. The device utilizes a solar powered panel to trigger a digital counter and tally days (and/or hours) displayed on a display screen disposed in front of the device. A stake is used for staking the device into a ground near the crops. The tally days (and/or hours) are also transmitted to a remote electronic device coupled to the counter system for display on the remote electronic device.

Referring initially to the drawings, FIG. 1 illustrates a perspective view of one potential embodiment of a solar powered digital counter device of the present invention in accordance with the disclosed architecture. The solar powered digital counter device 100 of the present invention is designed to keep track of light cycles for plants and other naturally aged products thereby eliminating the need for users to manually maintain a calendar and marking days. It is to be appreciated that naturally aged products can include any products where the cumulative daily exposure to sunlight (i.e., UV rays) is important to monitor. Such naturally aged products, for example, can include testing and monitoring the impacts of exposure of paints and stains, or other material durability testing. The counter device 100 has one-piece construction and is made of IP66 rated plastic, steel, or aluminum such that the device 100 can be used outdoors in gardens and farms for calculating harvest days. More specifically, the counter device 100 has a generally square or rectangular shape housing 102 with a wooden or metal stake 104 extending from the bottom surface 106 thereof. The pointed end 108 of the stake 104 allows the users to stake the counter device 100 into a ground surface near the crops without using any mechanical tools.

The counter device 100 is solar powered using a weatherproof solar panel 110 disposed on a top surface 112 of the housing 102. The solar panel 110 is configured to absorb solar energy falling thereon for converting into an electric signal which is in-turn converted to a desired voltage signal using a counter circuit module 114 as displayed in FIGS. 2 and 6. The solar panel 110 includes a plurality of photovoltaic cells that are configured to convert solar power into electric energy. The counter circuit module 114 is configured to produce a voltage signal that corresponds to an increase in the counter and the updated counter is configured to be displayed on the display screen 116. The display screen 116 is a low power LED screen for displaying a tally, a day count, or an hour count in a digital format allowing users to view the harvest days count or accumulation without any manual tracking.

The front surface 118 of the housing 102 also has a count push button 120 configured to display the current count of light days or tally days (or tally hours) on the screen 116. The screen 116 may go to a sleep mode or state for conserving energy produced by the solar panel 110. For activating the screen 116 and for changing color of illumination of the display screen 116, a LED button 122 is disposed on the front surface 118. For resetting the counter to zero in order to use the device 100 for a fresh crop or a fresh harvesting season, a re-set (RS) button 124 disposed on the front surface 118 is used. The push buttons 120, 122, 124 can be touch buttons or physical buttons based on manufacturing requirements of the device 100.

Figure 2:
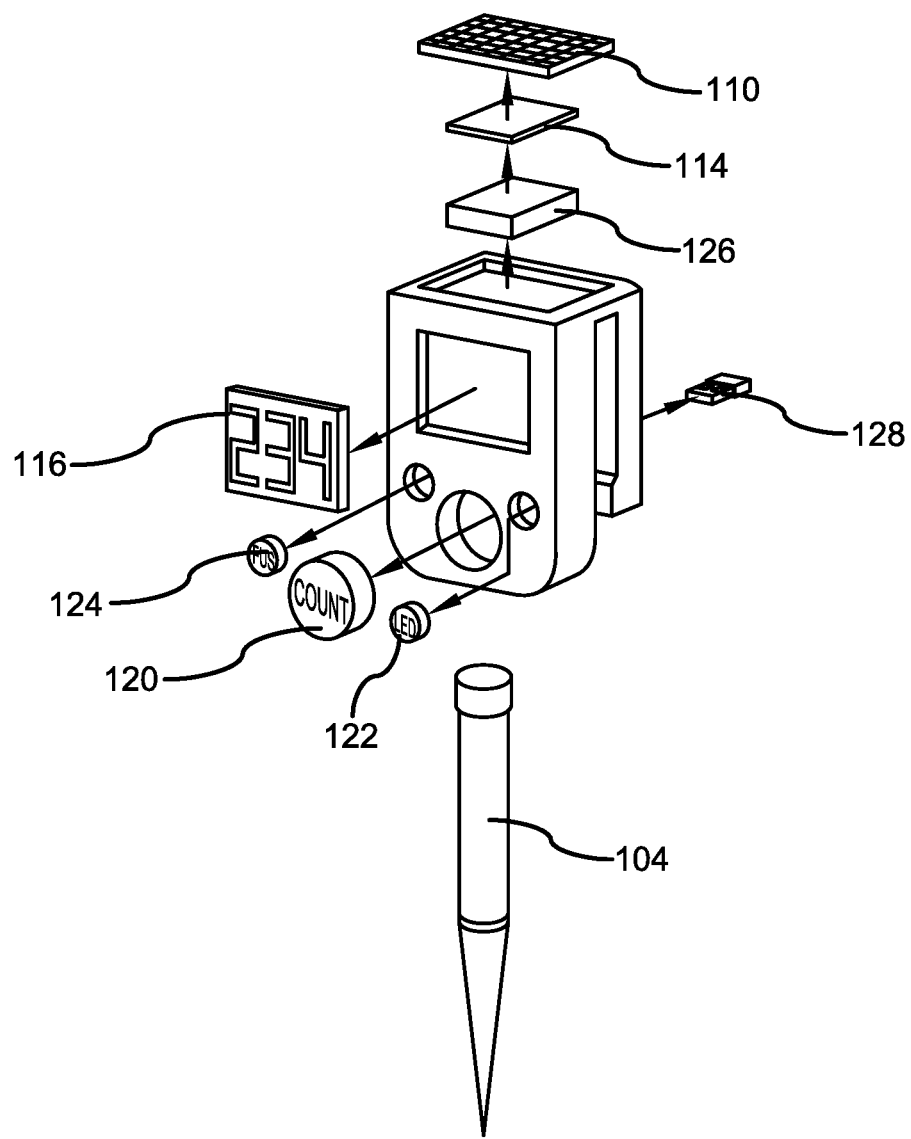
FIG. 2 illustrates an exploded view of the solar powered digital counter device of the present invention in accordance with the disclosed architecture.

A processor 126 as illustrated in exploded view of the device 100 in FIG. 2 is configured to control operation of the device 100 and provides an instruction to the display screen 116 based on inputs received from the activation of one or more of the push buttons 120, 122, 124. The stake 104 can be detached from the housing 102 and may be replaced with a new stake as per preferences of users.

Figure 3:
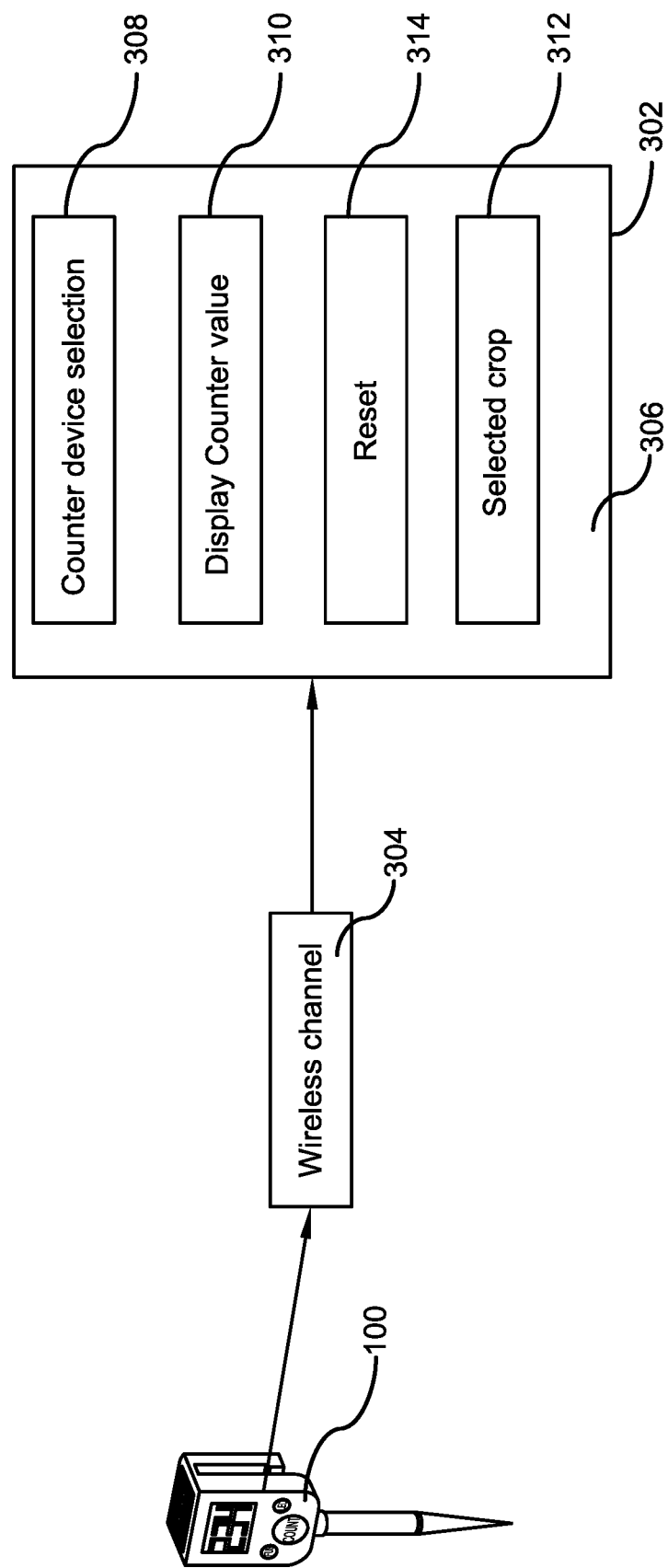
FIG. 3 illustrates a schematic view of communication between the digital counter device of the present invention and a remote electronic device in accordance with the disclosed architecture.

In one exemplary embodiment, the device 100 can be paired with a remote handheld electronic device such as a smartphone, PDA, computer tablet, and the like. The device 100 may transmit counter values to the remote electronic device allowing a user to remotely check the tally counter. In some embodiments, the device 100 may be remotely operated by the user using the remote electronic device as illustrated in FIG. 3. A wireless module 128 is configured to establish a wireless channel to pair the counter device 100 with a remote electronic device. The wireless module 128 is embedded inside the housing 102 and may provide a wireless communication channel including, but not limited to, Bluetooth, Wi-Fi, Infrared channel, or any other RFID channel.

Figure 5:
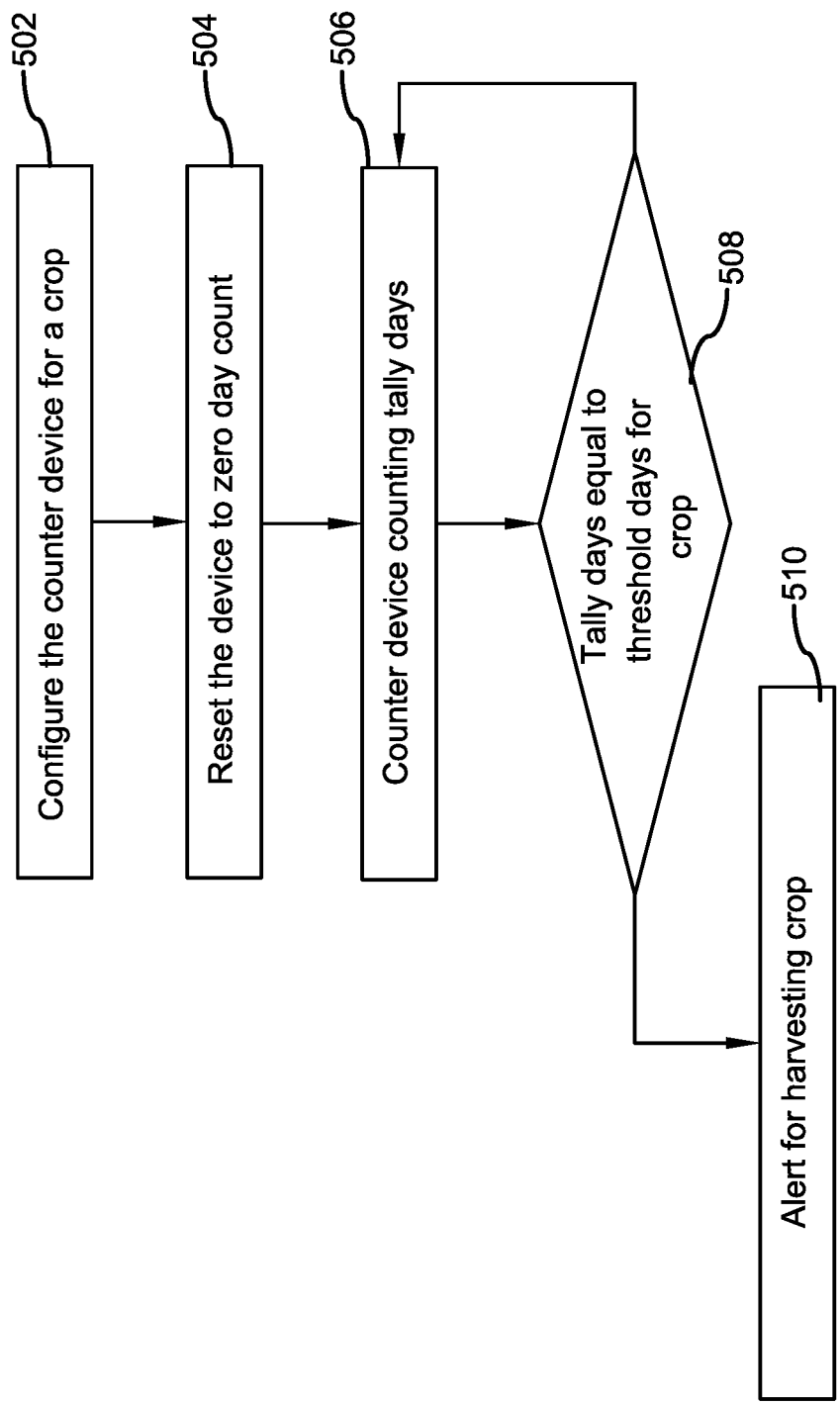
FIG. 5 illustrates a flow diagram depicting a process of generating an alert for harvesting of crops by the digital counter device of the present invention in accordance with the disclosed architecture.

The housing 102 may have dimensions from about 4"×3"×1" to about 5"×4"×2"and can also be configured for a specific type of crop as discussed in FIG. 5. The stake 104 can have a length of up to 10" for easily supporting the device 100 in any type of ground and farm terrain. The stake 104 helps users to install the device 100 directly within a garden or other growing area to tally the days (and/or hours) easily and effectively. The counter device 100 is configured to detect day cycles and night cycles for calculating a day counter and the day counter is updated and displayed on the display screen 116 for preventing individuals from forgetting to harvest their crops on a particular day.

FIG. 3 illustrates a schematic view of communication between the digital counter device of the present invention and a remote electronic device in accordance with the disclosed architecture. The harvest days counter device 100 is configured to wirelessly connect to the remote electronic device 302 via the wireless channel 304 for allowing a user such as a farmer to remotely monitor the device 302. The electronic device 302 may have a software application for providing a user interface 306 for displaying a plurality of information for allowing the user to operate the device 100.

The device 302 can be coupled to a plurality of the counter devices 100 installed at a plurality of farms and thus as illustrated, a specific counter device may be selected for monitoring using the counter device selection button 308. Information associated with the selected counter device is accordingly displayed on the user interface 306. For viewing days counter value on the user interface 306, the display counter value button 310 is selected and real time information of the counter value is displayed. In some embodiments of the present invention, an alert may be generated when a threshold number of tally days is reached for preventing a user to forget to harvest crop. The alert is generated when the counter device 100 is configured for a specific crop either manually or using the selected crop button 312. The counter value of the connected counter device can be reset remotely by the user using the reset button 314 on the user interface 306.

It should be noted that a user may remotely monitor one or more counter devices and counter device 100 of the present invention may have a unique identifier for identification. Further, the device 100 may not be configured for any crop or alternatively configured for a specific crop allowing a user to receive an alert when pre-configured harvest days or cumulative light cycles have been reached.

Figure 4:
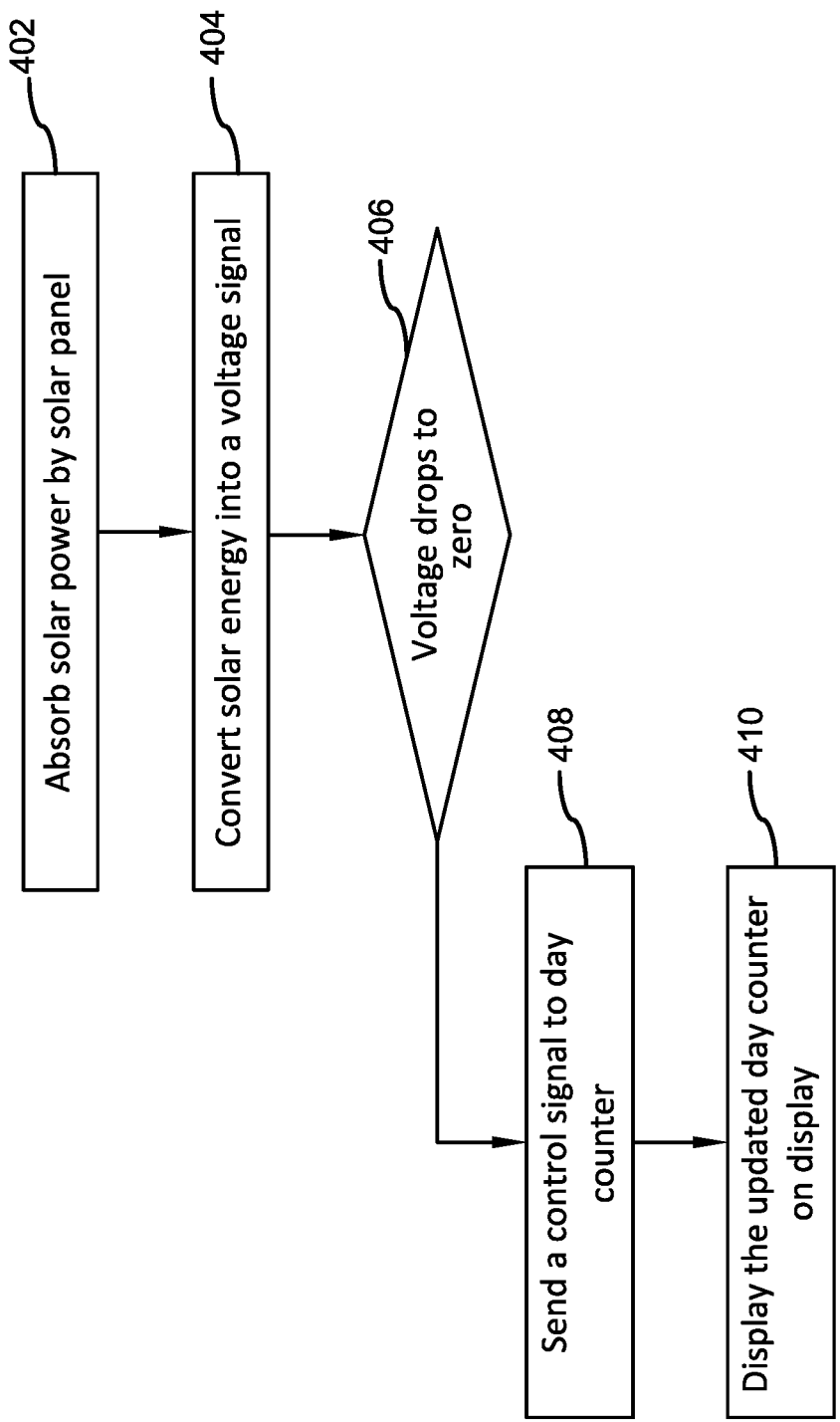
FIG. 4 illustrates a flow chart depicting a process of tracking and displaying harvesting days (i.e., cumulative light days and/or hours) by the digital counter device of the present invention in accordance with the disclosed architecture.

FIG. 4 illustrates a flow chart depicting a process of tracking and displaying harvesting days by the digital counter device of the present invention in accordance with the disclosed architecture. Initially, the solar panel of the counter device absorbs the solar power using the plurality of photovoltaic cells (Step 402). The solar panel is configured to produce a 3V-5V electric signal that is converted into a 1.5V voltage signal by the counter circuit module 114 (Step 404). Thereafter, voltage drop to zero is detected by the processor of the device 100 wherein the voltage is dropped to zero when no solar power is received by the solar panel (Step 406). The transition to zero voltage indicates completion of a light day and accordingly can be calculated as a harvesting day for counter purposes.

When the voltage is detected to be zero, then, a control signal is transmitted to the counter module for increasing the counter by one day (Step 408) and finally, the updated counter is displayed on the display screen of the device (Step 410). It should be appreciated that even low intensity solar energy is captured and used for increment of the counter by one day and thus, eliminates any false positives by the device 100.

FIG. 5 illustrates a flow diagram depicting a process of generating an alert for harvesting of crops by the digital counter device of the present invention in accordance with the disclosed architecture. In the present embodiment, the counter device is configured for a selected crop to calculate harvesting days (Step 502). The device may be configured during manufacturing of the device or alternatively can be done by a user remotely or using the reset button on the device. For use and start of the counter, the device is reset to zero for zero harvesting days (Step 504). Thereafter, as discussed in other embodiments of the present invention, the counter device calculates the harvesting days by increasing the counter on a daily basis (Step 506).

The counter device then compares the cumulative counted days or tally (i.e., the count) with the threshold harvesting days count of the crop for which the device 100 is configured (Step 508). In case, the number of counted days is equal to the threshold number of days, then, an alert is generated for alerting a user for harvesting the crop (Step 510). Else, the device continues to count number of days without generating the alert.

Figure 6:
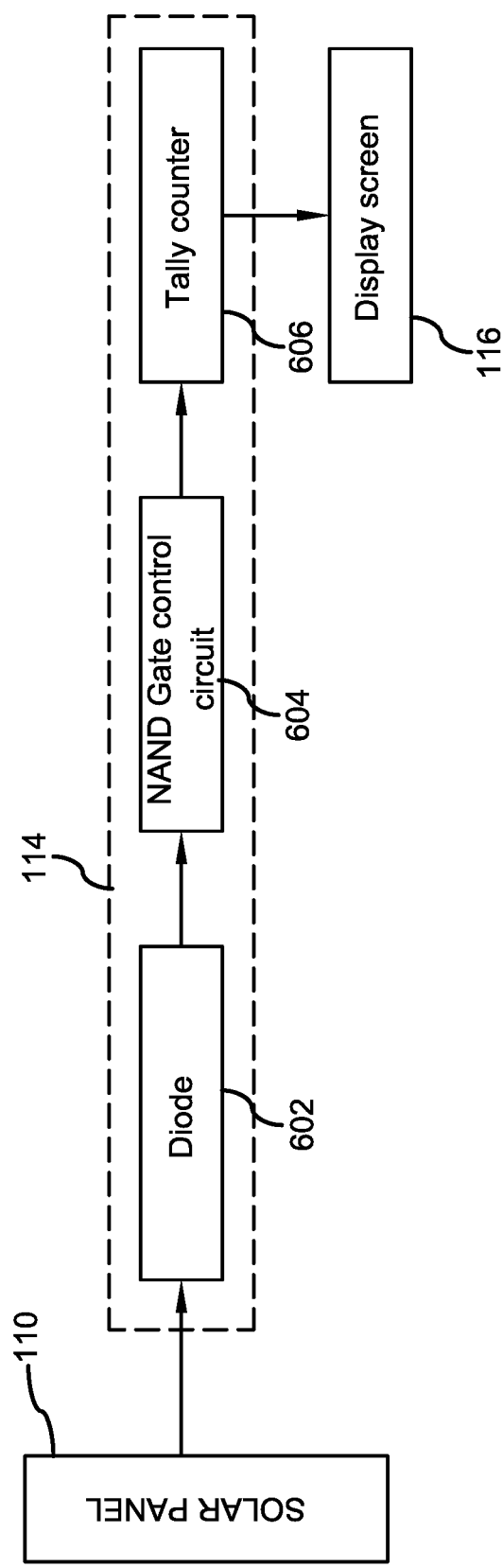
FIG. 6 illustrates a functional block diagram showing various components used in the digital counter device of the present invention for incrementing harvesting days counter in accordance with the disclosed architecture.

FIG. 6 illustrates a functional block diagram showing various components used in the digital counter device of the present invention for incrementing harvesting days counter in accordance with the disclosed architecture. The counter circuit module 114 includes a diode 602 such as a Schottky diode for improving efficiency of the solar panel 110. The diode 602 helps in preventing backflow of current and maintains constant flow of unidirectional current from the solar panel 110. The electric flow is then passed through a NAND gate control circuit 604, which involves a plurality of serially connected NAND gates. The NAND control circuit 604 is also configured to provide a constant voltage such as 1.5V to the tally counter 606 allowing the counter to increment the current counter value by one day. Accordingly, the updated counter value is displayed on the display screen 116 of the counter device 100. It should be noted that various electronic modules of the device 100 can be in the form of a printed circuit board, integrated chip and the like.

Figure 7:
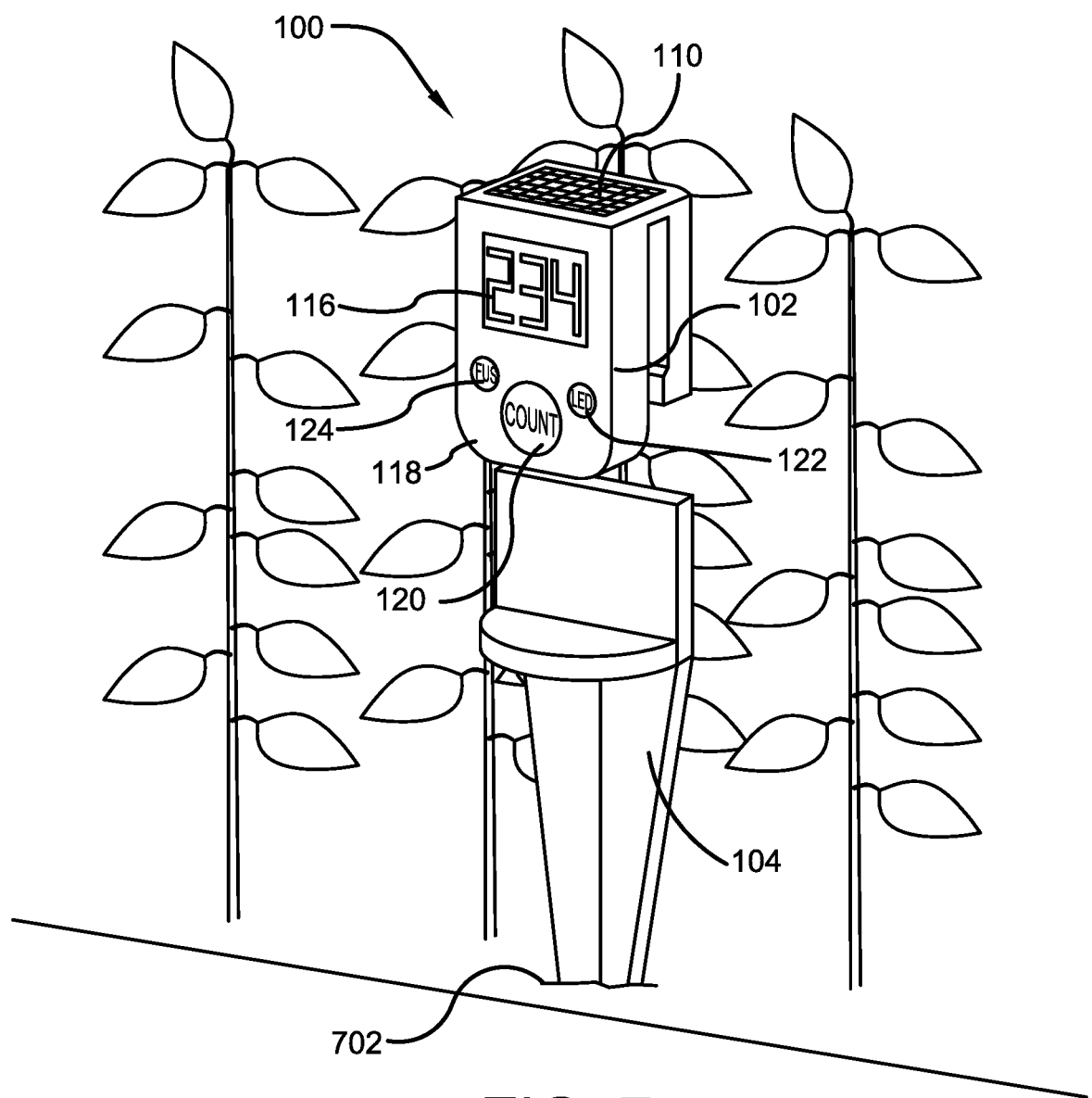
FIG. 7 illustrates a perspective view showing the harvest days counter device of the present invention staked in a garden for use in accordance with the disclosed architecture.

FIG. 7 illustrates a perspective view showing the harvest days counter device of the present invention staked in a garden for use in accordance with the disclosed architecture. As illustrated, the device 100 is staked into the ground 702 using the stake 104 in a position such that the solar panel 110 is exposed to the sunlight and the counter value is easily visible on the display screen 116. A plurality of such counter devices 100 can be placed in different farms, fields, and/or gardens thereby preventing individuals from forgetting to harvest their crops on a particular day and maximizing growth efficiency for the products.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "harvest days counter device", "counter device", "digital counter device", and "device" are interchangeable and refer to the solar powered digital counter device 100 of the present invention.

Notwithstanding the forgoing, the solar powered digital counter device 100 of the present invention can be of any suitable size and configuration as is known in the art without affecting the overall concept of the invention, provided that it accomplishes the above-stated objectives. One of ordinary skill in the art will appreciate that the solar powered digital counter device 100 as shown in the FIGS. are for illustrative purposes only, and that many other sizes and shapes of the solar powered digital counter device 100 are well within the scope of the present disclosure. Although the dimensions of the solar powered digital counter device 100 are important design parameters for user convenience, the solar powered digital counter device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A solar powered digital counter device configured to track light cycles for naturally aged products, the solar powered digital counter device comprising:
   a solar powered counter device comprised of a housing, a weatherproof solar panel disposed on a top surface of said housing, a counter circuit module, and a stake extending from a bottom surface of said housing;
   wherein said stake is anchored to the ground proximal to the naturally aged products;
   wherein said solar panel is comprised of a plurality of photovoltaic cells for absorbing solar energy and converting the solar energy into an electric signal;
   wherein said counter circuit module produces a voltage signal in response to said electric signal to increase a counter; and
   further wherein said counter is a cumulation of exposure of the naturally aged products to a sunlight.

2. The solar powered digital counter device of claim 1, wherein said housing comprises a screen for displaying said counter.

3. The solar powered digital counter device of claim 2 wherein said counter is an updated cumulative counter.

4. The solar powered digital counter device of claim 3, wherein said counter is a cumulative number of days.

5. The solar powered digital counter device of claim 4, wherein said cumulative number of days is a number of harvest days.

6. The solar powered digital counter device of claim 4, wherein said screen is a low power display LED screen.

7. The solar powered digital counter device of claim 6, wherein said housing is comprised of a material selected from a group consisting of an IP66 rated plastic, a steel and an aluminum.

8. The solar powered digital counter device of claim 4, wherein said housing comprises a reset button to reset said counter to zero.

9. The solar powered digital counter device of claim 3, wherein said counter is a cumulative number of hours.

10. A solar powered digital counter device configured to track light cycles for naturally aged products, the solar powered digital counter device comprising:
- a solar powered counter device comprised of a housing, a weatherproof solar panel disposed on a top surface of said housing, a counter circuit module, a wireless module and a stake extending from a bottom surface of said housing;
- wherein said stake anchored to a ground proximal to the naturally aged products;
- wherein said wireless module is embedded inside said housing to provide a wireless communication channel with a paired remote handheld electronic device;
- wherein said solar panel is comprised of a plurality of photovoltaic cells for absorbing solar energy falling thereon and converting the solar energy into an electric signal;
- wherein said counter circuit module produces a voltage signal in response to said electric signal to increase a counter;
- wherein said wireless module transmits said counter to said paired remote handheld electronic device; and
- further wherein said counter is a cumulation of exposure of the naturally aged products to a sunlight.

11. The solar powered digital counter device of claim 10, wherein said housing is comprised of a screen for displaying said counter.

12. The solar powered digital counter device of claim 11, wherein said counter is an updated cumulative counter.

13. The solar powered digital counter device of claim 12, wherein said counter is a cumulative number of days.

14. The solar powered digital counter device of claim 13, wherein said cumulative number of days is a number of harvest days.

15. The solar powered digital counter device of claim 12, wherein said counter is a cumulative number of hours.

16. The solar powered digital counter device of claim 12, wherein said screen is a low power display LED screen.

17. The solar powered digital counter device of claim 12, wherein said housing is comprised of a reset button to reset said counter to zero.

18. A solar powered digital counter device configured to track light cycles for naturally aged products, the solar powered digital counter device comprising:
- a solar powered counter device comprised of a housing, a weatherproof solar panel disposed on a top surface of said housing, a counter circuit module, and a stake extending from a bottom surface of said housing;
- wherein said stake is anchored to the ground proximal to the naturally aged products;
- wherein said solar panel having a plurality of photovoltaic cells for absorbing solar energy falling thereon and converting the solar energy into an electric signal;
- wherein said counter circuit module produces a voltage signal in response to said electric signal to increase a counter; and
- further wherein said counter is an updated cumulative number of light cycles of light exposure of the naturally aged products.

19. The solar powered digital counter device of claim 18, wherein said updated cumulative number of light cycles is an updated cumulative number of days.

20. The solar powered digital counter device of claim 18, wherein said updated cumulative number of days is an updated cumulative number of harvest days.

* * * * *